(12) United States Patent
Muraza et al.

(10) Patent No.: US 11,247,911 B2
(45) Date of Patent: Feb. 15, 2022

(54) SDA-FREE SYNTHESIS OF CHABAZITE (CHA) ZEOLITE AND USES THEREOF

(71) Applicant: SABIC Global Technologies B.V., Bergen op Zoom (NL)

(72) Inventors: Oki Muraza, Dhahran (SA); Galal A. Nasser, Dhahran (SA); Zuhair O. Malaibari, Dhahran (SA); Talal K. Al Shammari, Riyadh (SA); Vyas M. Mayank, Riyadh (SA); Zain Yamani, Dhahran (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/733,504

(22) PCT Filed: Apr. 22, 2019

(86) PCT No.: PCT/IB2019/053316
§ 371 (c)(1),
(2) Date: Aug. 14, 2020

(87) PCT Pub. No.: WO2019/211702
PCT Pub. Date: Nov. 7, 2019

(65) Prior Publication Data
US 2021/0101799 A1    Apr. 8, 2021

Related U.S. Application Data

(60) Provisional application No. 62/666,199, filed on May 3, 2018.

(51) Int. Cl.
*C01B 39/46*  (2006.01)
*B01J 29/70*  (2006.01)
(Continued)

(52) U.S. Cl.
CPC .......... *C01B 39/46* (2013.01); *B01J 29/7015* (2013.01); *B01J 37/06* (2013.01); *B01J 37/08* (2013.01);
(Continued)

(58) Field of Classification Search
CPC ... C01B 39/46; B01J 29/7015; C01P 2002/72; C01P 2004/38; C01P 2004/50; C01P 2004/61
See application file for complete search history.

(56) References Cited

U.S. PATENT DOCUMENTS 4,544,538 A    10/1985  Zones
8,007,764 B2    8/2011  Miller et al.
(Continued)

FOREIGN PATENT DOCUMENTS

CN    102285666 A    12/2011
CN    102442679 A    5/2012
(Continued)

OTHER PUBLICATIONS

Aufdembrink, et al. "Spectroscopic Characterization of Acidity in Chabazite," *The Journal of Physical Chemistry B*, 2003, 107(37):10025-10031.
(Continued)

*Primary Examiner* — David M Brunsman
(74) *Attorney, Agent, or Firm* — Norton Rose Fulbright US LLP

(57) ABSTRACT

A method of making a chabazite zeolite is disclosed. The method can include obtaining an aqueous gel comprising silicon dioxide, aluminum oxide, potassium oxide, and a nucleating agent, and hydrothermally treating the aqueous gel to obtain the chabazite zeolite.

19 Claims, 7 Drawing Sheets

(51) Int. Cl.
    *B01J 37/06*    (2006.01)
    *B01J 37/08*    (2006.01)
(52) U.S. Cl.
    CPC ...... *C01P 2002/72* (2013.01); *C01P 2004/38* (2013.01); *C01P 2004/50* (2013.01); *C01P 2004/61* (2013.01)

(56) References Cited

U.S. PATENT DOCUMENTS

| | | | |
|---|---|---|---|
| 2008/0159950 | A1 | 7/2008 | Miller et al. |
| 2011/0020204 | A1 | 1/2011 | Bull et al. |
| 2021/0101799 | A1* | 4/2021 | Muraza ............... C01B 39/46 |

FOREIGN PATENT DOCUMENTS

| | | |
|---|---|---|
| CN | 106145137 A | 11/2016 |
| CN | 106145138 A | 11/2016 |
| CN | 107673369 A | 2/2018 |

OTHER PUBLICATIONS

Gao, et al. "Understanding ammonia selective catalytic reduction kinetics over Cu/SSZ-13 from motion of the Cu ions," *Journal of Catalysis*, 2014, 319:1-14.

Hu et al. "Fluoride-mediated synthesis of high-flux chabazite membranes for pervaporation of ethanol using reusable macroporous stainless steel tubes," *J. Membrane Science*, 2016, 510:91-100.

Imai, et al. "Direct crystallization of CHA-type zeolite from amorphous aluminosilicate gel by seed-assisted method in the absence of organic-structure-directing agents," *Microporous and Mesoporous Materials*, 2014, 196:341-348.

International Search Report and Written Opinion issued in International Patent Application No. PCT/IB2019/053316, dated Jul. 12, 2019.

Liu et al. "Synthesis of low-silica CHA zeolite chabazite in fluoride media without organic structural directing agents and zeolites," *Microporous and Mesoporous Materials*, 2014, 196:270-276.

Lobo, "Introduction to the Structural Chemistry of Zeolites," *Handbook of Zeolite Science and Technology*, 2003, 65-91. (spec).

Martin, et al. "High yield synthesis of high-silica chabazite by combining the role of zeolite precursors and tetraethylammonium: SCR of NOx," *Chemical Communications*, 2015, 51:9965-9968.

Martinez, et al. "Zeolites," *Comprehensive Inorganic Chemistry II (Second Edition)*, 2013, 5:103-131.

Nedyalkova, et al. "Interzeolite Conversion of FAU Type Zeolite into CHA and its Application in NH3-SCR," *Topics in Catalysis*, 2013, 56(9):550-557.

Ridha, et al. "Adsorption characteristics of a fully exchanged potassium chabazite zeolite prepared from decomposition of zeolite Y," *Microporous and Mesoporous Materials*, 2009, 117(1-2):497-507.

Shang, et al. "Potassium Chabazite: A Potential Nanocontainer for Gas Encapsulation," *The Journal of Physical Chemistry C*, 2010, 114(50):22025-22031.

Smith, "Site Preferences in the Mixed Cation Zeolite, Li, Na-Chabazite: A Combined Solid-State NMR and Neutron Diffraction Study," *J. Am. Chern. Soc.*, 2000, 122(8):1700-1708.

Sommer, et al. "Mesopore formation in zeolite H-SSZ-13 by desilication with NaOH," *Microporous and Mesoporous Materials*, 2010, 132:384-394.

* cited by examiner

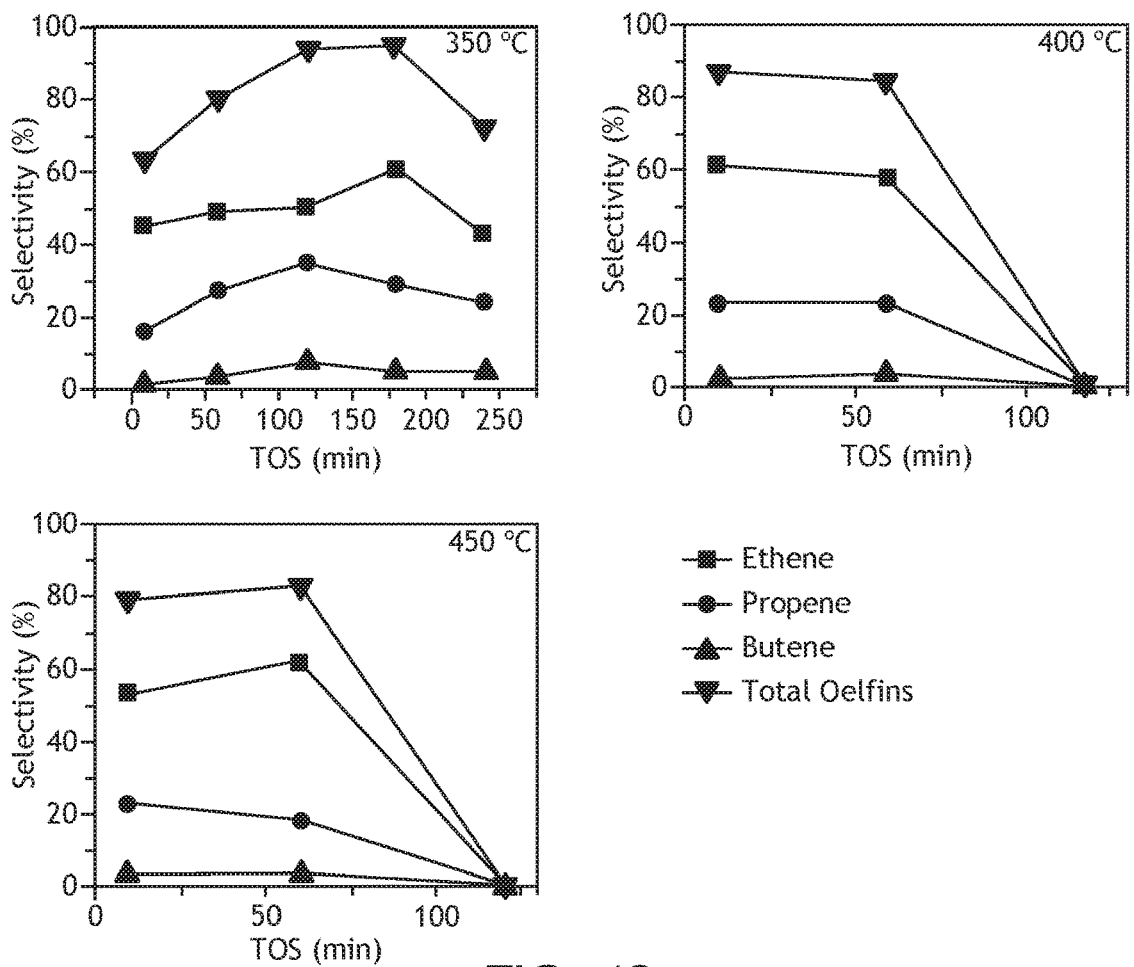
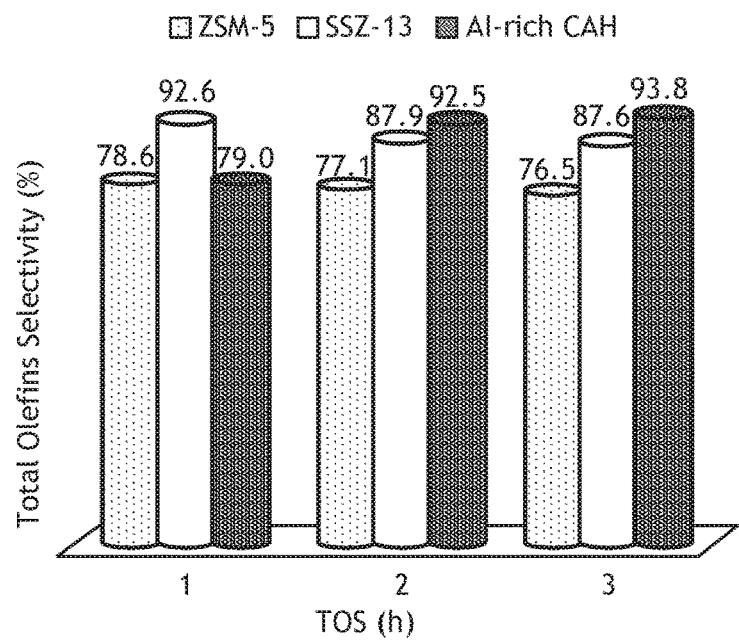
FIG. 14

SDA-FREE SYNTHESIS OF CHABAZITE (CHA) ZEOLITE AND USES THEREOF

CROSS REFERENCE TO RELATED APPLICATIONS

This application is a national phase application under 35 U.S.C. § 371 of International Application No. PCT/IB2019/053316 filed Apr. 22, 2019, which claims the benefit of priority to U.S. Provisional Application No. 62/666,199, filed May 3, 2018, the entire contents of which are incorporated herein by reference in their entirety.

BACKGROUND OF THE INVENTION

A. Field of the Invention

The invention generally concerns non-templated chabazite (CHA) zeolites and methods for making and using the same in chemical reactions such as the methanol to olefin reaction (MTO reaction) or the ammonia selective catalytic reduction ($NH_3$-SCR) reaction.

B. Description of Related Art

Zeolites are microporous crystalline solid acidic materials with channels and cavities size ranging between 0.3 and 1.5 nm (C. Martinez, A. Corma, 5.05-Zeolites A2--Reedijk, Jan, in: K. Poeppelmeier (Ed.) Comprehensive Inorganic Chemistry II (Second Edition), Elsevier, Amsterdam, 2013, pp. 103-131.) Zeolites are crucial materials and due to their distinct properties they have wide range of applications in industry as adsorbents, catalysts and detergents (Martinez and Corma (2013)). There are more than 232 zeolites frameworks recorded in the International Zeolite Association (IZA). The structure of these zeolites framework general include several building units. The primary building unit of zeolites is the tetrahedra of $AlO_4$, $SiO_4$ (aluminosilicate zeolites), and $PO_4$ in the case of silicoaluminophosphate zeolites (R. Xu, W. Pang, J. Yu, Q. Huo, J. Chen, Structural Chemistry of Microporous Materials, Chemistry of Zeolites and Related Porous Materials, John Wiley & Sons, Ltd2010, pp. 19-116.). More complex building units of zeolites are formed by the combination of the primary building units. The 4-corner sharing of the tetrahedra results in a microporous and low framework density. The framework density is defined as the number of T atoms per 1000 Å (Xu et al. (2010). Generally, the structure of zeolites can be viewed as a composite of rings which are formed by a number of tetrahedra. The name of the ring is given based on the number of tetrahedral it contains. For example, the 4-ring (4R) includes 4 tetrahedra. Other tetrahedral n-rings also exist, where n can be 4, 6, 6, 10 or 12 tetrahedra (F. L. Rani, Introduction to the Structural Chemistry of Zeolites, Handbook of Zeolite Science and Technology, CRC Press2003). Chabazite zeolite, which exists in nature and which can be chemically synthesized has a three-dimensional network of interconnected pores with a framework density and pore dimension of 14.5 T/1000 Å$^3$ and 3.8×3.8 Å (IZA), respectively. Generally, zeolites, including CHA zeolite, have been applied in different areas. For example, CHA zeolite was used in adsorption, ion-exchange (L. J. Smith, H. Eckert, A. K. Cheetham, Site Preferences in the Mixed Cation Zeolite, Li,Na-Chabazite: A Combined Solid-State NMR and Neutron Diffraction Study, Journal of the American Chemical Society, 122 (2000) 1700-1708) and as a catalyst in the conversion of methanol to olefins (MTO) or in the $NH_3$ selective catalytic reduction (SCR) of $NO_x$ (F. Gao, E. D. Walter, M. Kollar, Y. Wang, J. Szanyi, C. H. F. Peden, Understanding ammonia selective catalytic reduction kinetics over Cu/SSZ-13 from motion of the Cu ions, Journal of Catalysis, 319 (2014) 1-14.). CHA zeolite can be classified based on the Si/Al ratio into CHA with high Si/Al ratio (>3, it can be as high as 7.5 and CHA with low Si/Al ratio (<3). The high Si/Al ratio is represented by SSZ-13 zeolite which has been prepared using N,N,N-trimethyl-1-adamantammonium (TMAda+) iodide as templating or structure directing agent (SDA) (U.S. Pat. No. 4,544,538). Others SDA combined with (TMAda+) iodide templates or seed have been used in the synthesis of SSZ-13 (U.S. Pat. No. 8,007,764). Although the templated CHA zeolites showed good activity as a catalyst in the MTO reaction, the process to make these zeolites are inefficient from a cost perspective due to the expenses associated with having to use the templating or SDA agents. Therefore, these processes are not commercially viable for the chemical industry. Attempts have been made to reduce the associated costs for producing CHA zeolites. By way of example, one attempt includes not using a SDA but requires the use of a pre-synthesized FAU zeolite. In particular, FAU zeolite was converted to a CHA zeolite by hydrothermal synthesis in alkaline solution (N. Martin, M. Moliner, A. Corma, High yield synthesis of high-silica chabazite by combining the role of zeolite precursors and tetraethylammonium: SCR of NOx, Chemical Communications, 51 (2015) 9965-9968.). The costs of obtaining a FAU zeolite, however, can make this process economically inefficient and therefore not scalable for commercial use. While various methods have been developed to produce CHA zeolites, these methods oftentimes suffer from the costs and complexities associated with the materials needed to produce such zeolites. This results in processes that are not commercially viable for the chemical industry.

SUMMARY OF THE INVENTION

A discovery has been made that provides a solution to at least some of the problems associated with producing CHA zeolites. The solution is premised on an elegant process to produce CHA zeolites from basic chemicals. Notably, the process of the present invention does not require the use of a templating/structure directing agent (SDA) (templating and structure directing agent can be used interchangeably throughout the present specification) nor the use of FAU as a starting material. Therefore, the present invention provides for a direct and reproducible CHA zeolite synthesis method from basic chemicals, which results in a time and cost-efficient production process that can be scalable for commercial use by the chemical industry. Even further, and as illustrated in a non-limiting manner in the Examples, the resulting CHA zeolites produced by the processes of the present invention have good catalytic activity in the conversion of methanol to olefins (MTO). It is believed that these materials also will have good catalytic activity in the ammonia selective catalytic reduction ($NH_3$-SCR) reaction.

In one aspect of the present invention a method of making a chabazite (CHA) zeolite is disclosed. The method can include obtaining an aqueous gel comprising silicon dioxide ($SiO_2$), aluminum oxide ($Al_2O_3$), potassium oxide ($K_2O$), and a nucleating agent, and hydrothermally treating the aqueous gel to obtain the CHA zeolite. The aqueous gel can be obtained by forming an aqueous solution comprising an aluminum ion source, preferably aluminum hydroxide, and a potassium ion source, preferably potassium hydroxide, and adding a fluoride source, preferably ammonium fluoride, and a silica source, preferably colloidal silica, to the aqueous solution to form the aqueous gel. The aqueous gel can be maintained at room temperature (15° C. to 35° C., preferably 20° C. to 30° C.) for up to 24 hours, preferably 6 to 24 hours, 6 to 12 hours, or 12 to 24 hours prior to being subjected to hydrothermal treatment. In a preferred aspect, the nucleating agent can be a fluoride-containing nucleating agent (e.g., ammonium fluoride ($NH_4F$)). The gel can have has a molar composition of $1SiO_2$: $0.2Al_2O_3$: $0.39K_2O$: $0.3NH_4F$: $xH_2O$, where x is the molar ratio of $H_2O/SiO_2$ and ranges from 10 to 20, preferably 13 to 17 or 14 to 16 or more preferably 15. The gel can have a molar composition of $1SiO_2$: $0.2Al_2O_3$: $0.39K_2O$: $yNH_4F$: $15H_2O$. The gel can have a molar composition of $1SiO_2$: $zAl_2O_3$: $0.39K_2O$: $0.3NH_4F$: $15H_2O$. The gel can have a molar composition of $1SiO_2$: $0.2Al_2O_3$: w $K_2O$: $0.3NH_4F$: $15H_2O$. The gel can have a molar composition of $1SiO_2$: $0.2Al_2O_3$: $wK_2O$: $0.04Na_2O$: $0.3NH_4F$: $15H_2O$. The hydrothermal treatment can be performed at a temperature of 130° C. to 200° C., preferably 160° C., under autogenous pressure for 12 hours to 150 hours, preferably 48 hours to 120 hours, 48 hours to 72 hours, 48 hours to 96 hours, 72 hours to 120 hours, 72 hours to 96 hours, 96 hours to 120 hours, or about 48, 72, 96, or 120 hours. The method can further include washing the CHA zeolite, preferably with deionized water until a pH of around 7 is obtained; and optionally performing an ion-exchange to protonate the CHA zeolite to produce an H-form of the CHA zeolite. The produced CHA zeolite can be calcined, preferably at 400° C. to 600°, C. for 2 hours to 10 hours, preferably 500° C. for 5 hours. As explained above, templating agents or SDA agents are not required to produce the CHA zeolites of the present invention. An example of a templating agent that is not needed in the context of the present invention includes N,N,N-trimethyl-1-adamantammonium iodide.

Also disclosed in the context of the present invention is a non-templated chabazite (CHA) zeolite having pure CHA-phase with an impurity of other zeolitic frameworks of less than 5%, preferably less than 2%, or more preferably less than 1%, or even more preferably no other zeolitic frameworks are present in the CHA zeolite. The non-templated CHA zeolite of the present invention is not derived from faujasite (FAU) zeolite. The non-templated CHA zeolite can have an XRD pattern as illustrated in FIG. 2, FIG. 3, FIG. 5, or FIG. 8. The CHA zeolite may include other zeolite phases and/or may include amorphous/non-crystalline phases. However, and in certain preferred aspects of the present invention, the CHA zeolite does not comprise an amorphous phase and does not comprise a zeolitic merlinoite (MER) phase or any other zeolitic phases. In certain aspects, the CHA zeolite of the present invention has a silica ($SiO_2$) to alumina ($Al_2O_3$) (SAR) ratio of 14 or less, 3.3 or less, preferably 2 to 3, or more preferably 2.5.

In another aspect of the present invention there is disclosed a method of catalyzing a chemical reaction with the chabazite (CHA) zeolite of the present invention. The method can include contacting a reactant feed with the chabazite (CHA) zeolite and producing a chemical from the reactant feed. In preferred instances, the chemical reaction is a methanol to olefin reaction (MTO reaction) or an ammonia selective catalytic reduction ($NH_3$-SCR) reaction. It is also contemplated in the context of the present invention that the CHA zeolite can be doped with catalytic material. By way of example, the catalytic material can be a catalytic metal or a metal oxide, or alloys or mixtures thereof. The metal material can include a Column 1 metal, a Column 2 metal, a transition metal, post-transition metal, or lanthanide metal or any allow or combination thereof. The catalytic material can include at 0.5 wt. % to 10 wt. % of the total weight of the CHA zeolite/catalytic material combination. The catalytic material can be deposited on the surface or dispersed throughout the CHA zeolite of the present invention. The catalytic material can be in nanostructure or nanomaterial form.

The following includes definitions of various terms and phrases used throughout this specification.

"Nanostructure" or "nanomaterial" refer to an object or material in which at least one dimension of the object or material is equal to or less than 1000 nm (e.g., one dimension is 1 to 1000 nm in size). In a particular aspect, the nanostructure includes at least two dimensions that are equal to or less than 1000 nm (e.g., a first dimension is 1 to 1000 nm in size and a second dimension is 1 to 1000 nm in size). In another aspect, the nanostructure includes three dimensions that are equal to or less than 100,000 nm (e.g., a first dimension is 1 to 1000 nm in size, a second dimension is 1 to 1000 nm in size, and a third dimension is 1 to 1000 nm in size). The shape of the nanostructure can be of a wire, a particle (e.g., having a substantially spherical shape), a rod, a tetrapod, a hyper-branched structure, a tube, a cube, or mixtures thereof. "Nanoparticles" include particles having an average diameter size of 1 to 1000 nanometers.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %," "vol. %," or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The methods of making the CHA zeolite, the use of the zeolite in a chemical reaction, and the zeolite can "comprise," "consist essentially of," or "consist of" particular ingredients, components, compositions, etc. disclosed throughout the specification. With respect to the transitional phrase "consisting essentially of," in one non-limiting aspect, a basic and novel characteristic of the process of making the CHA zeolite is that it can be made without the use of a templating or structure directing agent (including both organic and inorganic templating/SDA agents) and can be made without using FAU as a starting material. Rather, the CHA zeolites of the present invention can be made from cost efficient materials in the manner described throughout the present specification.

Any method can be used with any composition of the present invention and vice versa. Further, any aspects and embodiments of the present invention can be combined together irrespective of whether they are in separate paragraphs.

In the context of the present invention, at least twenty embodiments are now described. Embodiment 1 is a method of making a chabazite (CHA) zeolite. The method includes the steps of (a) obtaining an aqueous gel comprising silicon dioxide ($SiO_2$), aluminum oxide ($Al_2O_3$), potassium oxide ($K_2O$), and a nucleating agent; and (b) hydrothermally treating the aqueous gel to obtain the CHA zeolite. Embodiment 2 is the method of embodiment 1, wherein the aqueous gel in step (a) is maintained at room temperature for up to 24 hours, preferably 6 to 24 hours, 6 to 12 hours, or 12 to 24 hours prior to the step (b) hydrothermal treatment. Embodiment 3 is the method of any one of embodiments 1 to 2, wherein the nucleating agent is a fluoride-containing nucleating agent. Embodiment 4 is the method of embodiment 3, wherein the fluoride-containing nucleating agent is ammonium fluoride ($NH_4F$). Embodiment 5 is the method of any one of embodiments 1 to 4, wherein the gel has a molar composition of: $1SiO_2$: $0.2Al_2O_3$: $0.39K_2O$: $0.3NH_4F$: $xH_2O$, where x is the molar ratio of $H_2O/SiO_2$ and ranges from 10 to 20, preferably 15; $1SiO_2$: $0.2Al_2O_3$: $0.39K_2O$: $yNH_4F$: $15H_2O$; $1SiO_2$: $zAl_2O_3$: $0.39K_2O$: $0.3NH_4F$: $15H_2O$; $1SiO_2$: $0.2Al_2O_3$: $w K_2O$: $0.3NH_4F$: $15H_2O$; or $1SiO_2$: $0.2Al_2O_3$: $wK_2O$: $0.04Na_2O$: $0.3NH_4F$: $15H_2O$. Embodiment 6 is the method of any one of embodiments 1 to 5, wherein hydrothermal treatment is performed at a temperature of 130° C. to 200° C., preferably 160° C., for 12 hours to 150 hours, preferably 48 hours to 120 hours, 48 hours to 72 hours, 48 hours to 96 hours, 72 hours to 120 hours, 72 hours to 96 hours, 96 hours to 120 hours, or about 48, 72, 96, or 120 hours. Embodiment 7 is the method of any one of embodiments 1 to 6, further including the steps of (c) washing the CHA zeolite, preferably with deionized water until a pH of around 7 is obtained; and (d) optionally performing an ion-exchange to protonate the CHA zeolite to produce an H-form of the CHA zeolite. Embodiment 8 is the method of any one of embodiments 1 to 7, wherein the CHA zeolite is calcined, preferably at 400° C. to 600° C., for 2 hours to 10 hours, preferably 500° C. for 5 hours. Embodiment 9 is the method of any one of embodiments 1 to 8, wherein the aqueous gel from step (a) is obtained by: (i) forming an aqueous solution including an aluminum ion source, preferably aluminum hydroxide, and a potassium ion source, preferably potassium hydroxide; and (ii) adding a fluoride source, preferably ammonium fluoride, and a silica source, preferably colloidal silica, to the aqueous solution to form the aqueous gel. Embodiment 10 is the method of any one of embodiments 1 to 11, wherein a templating agent is not used to produce the CHA zeolite. Embodiment 11 is the method of embodiment 10, wherein the templating agent is N,N,N-trimethyl-1-adamantammonium iodide. Embodiment 12 is the method of any one of embodiments 1 to 2, wherein the CHA zeolite does not include an amorphous phase. Embodiment 13 is the method of any one of embodiments 1 to 12, wherein the CHA zeolite does not include a zeolitic merlinoite (MER) phase. Embodiment 14 is the method of any one of embodiments 1 to 13, wherein the CHA zeolite is pure CHA-phase having an impurity of other zeolitic frameworks of less than 5%, preferably less than 2%, or more preferably less than 1%, or even more preferably no other zeolitic frameworks are present in the CHA zeolite. Embodiment 15 is the method of any one of embodiments 1 to 14, wherein the CHA zeolite has a silica ($SiO_2$) to alumina ($Al_2O_3$) (SAR) ratio of 14 or less, 3.3 or less, preferably 2 to 3, or more preferably 2.5. Embodiment 16 is a chabazite (CHA) zeolite made from the process of any one of embodiments 1 to 15. Embodiment 17 is a non-templated chabazite (CHA) zeolite having pure CHA-phase with an impurity of other zeolitic frameworks of less than 5%, preferably less than 2%, or more preferably less than 1%, or even more preferably no other zeolitic frameworks are present in the CHA zeolite, wherein the non-templated CHA zeolite is not derived from faujasite (FAU) zeolite. Embodiment 18 is the non-templated CHA zeolite of embodiment 17 having an XRD pattern as illustrated in FIG. 2, FIG. 3, FIG. 5, or FIG. 8. Embodiment 19 is the non-templated CHA zeolite of embodiment 18, having a silica ($SiO_2$) to alumina ($Al_2O_3$) (SAR) ratio of 14 or less, 3.3 or less, preferably 2 to 3, or more preferably 2.5. Embodiment 20 is a method of catalyzing a chemical reaction, the method including the steps of contacting a reactant feed with the chabazite (CHA) zeolite of any of embodiment 16 to 18 and producing a chemical from the reactant feed, preferably the chemical reaction is a methanol to olefin reaction (MTO reaction) or an ammonia selective catalytic reduction ($NH_3$-SCR) reaction.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

FIG. 13: Selectivity to olefins as a function of time on stream (TOS) over H-CHA zeolite at different temperatures.

FIG. 14: Comparison of olefins selectivity of Al-rich CHA with the commercial ZSM-5.

Figure 1:
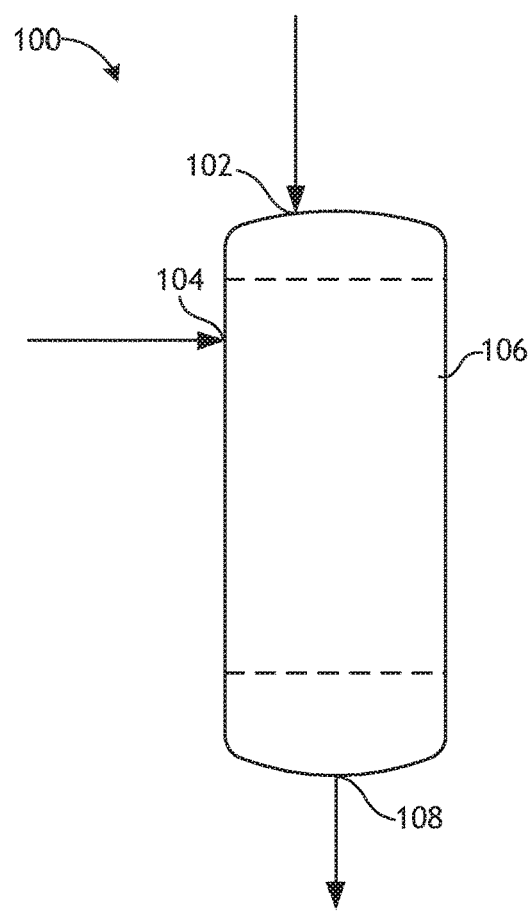
FIG. 1: a schematic of a system to produce a chemical compound using the supported catalyst of the present invention.

While the invention is susceptible to various modifications and alternative forms, specific embodiments thereof are shown by way of example in the drawings. The drawings may not be to scale.

DETAILED DESCRIPTION OF THE INVENTION

The present invention provides a solution to at least some of the cost inefficiencies and complexities surrounding the production of commercially viable chabazite (CHA) zeolites. In particular, the present invention provides for a direct and reproducible CHA zeolite synthesis method from basic chemicals without the need for templating agents or FAU zeolites as starting materials. This results in a time and cost-efficient production process that can be scalable for commercial use by the chemical industry. As illustrated in a non-limiting manner in the below examples, CHA zeolites of the present invention have good catalytic activity for the methanol to olefin reaction. It is also expected that the CHA zeolites of the present invention can be used to catalyze the ammonia selective catalytic reduction ($NH_3$-SCR) reaction.

These and other non-limiting aspects of the present invention are discussed in further detail in the following sections with reference to the figures.

A. Methods of Making the CHA Zeolite

The general process for making the CHA zeolite of the present invention can include obtaining an aqueous gel comprising silicon dioxide ($SiO_2$), aluminum oxide ($Al_2O_3$), potassium oxide ($K_2O$), and a nucleating agent. The aqueous gel can be prepared by (i) forming an aqueous solution comprising an aluminum ion source, preferably aluminum hydroxide, and a potassium ion source, preferably potassium hydroxide. This step can be performed under heat (e.g., 50° C. to 100° C.) for a sufficient time to ensure a homogenous solution is obtained (e.g., 15 minutes, 30 minutes, 1 2, 3, or 4 or more hours). The solution can be cooled to room temperature followed by adding a fluoride source, preferably ammonium fluoride, and a silica source, preferably colloidal silica, to the aqueous solution to form the aqueous gel. The aqueous solution can be stirred/mixed for varying periods of time to age the gel (e.g., 2, 4, 6, 8, 10, 12, 14, 16, 18, 20, 22, 24, 30, 36, 42, or 48 hours, or more).

Once the gel is obtained, it can be hydrothermally treated to obtain the CHA zeolite. Hydrothermal treatment can be performed under autogenous pressure. It can be performed in a PTFE-lined stainless-steel autoclave. After hydrothermal treatment, the CHA zeolite can be washed/rinsed, preferably with deionized water followed by drying (e.g., air drying or with heat). In some aspects, the dried CHA zeolite can then be subjected to an ion-exchange step so as to protonate the CHA zeolite and produce the protonated (H-form) of the CHA zeolite. The ion-exchange step can be performed with a proton source (e.g., $NH_4NO_3$) by subjecting the CHA zeolite to a solution having the proton source and treating under reflux (e.g., 50° C. to 100° C., preferably 80° C.) for a sufficient period of time (1 hour to 5 hours, preferably 3 hours). This step can be repeated as needed. Subsequently, the CHA zeolite can be calcined at 400° C. to 600° C., preferably 500° C. for a sufficient period of time (e.g., 2 hours to 12 hours, preferably about 5 hours) using a muffle furnace. The heating rate can be 2 to 15° C./min., or about 10° C./min.

B. System for Production of Chemical Compounds

CHA zeolites of the present invention can be used for a variety of chemical reactions. In preferred instances, the CHA zeolites can be used for the methanol to olefin reaction (MTO reaction) or the ammonia selective catalytic reduction ($NH_3$-SCR) reaction.

FIG. 1 depicts a schematic for a system to produce a chemical compound. The system 100 can include an inlet 102 for a first reactant feed, an inlet 104 for a second reactant feed, a reaction zone 106 (e.g., a continuous flow reactor selected from a fixed-bed reactor, a fluidized reactor, or a moving bed reactor) that is configured to be in fluid communication with the inlets 102 and 104, and an outlet 108 configured to be in fluid communication with the reaction zone 106 and configured to remove a product stream from the reaction zone. In some instances, a second reactant feed may not be needed and second inlet 104 may also not be needed. The reactant zone 106 can include a CHA zeolite of the present invention. The first reactant feed can enter the reaction zone 106 via the inlet 102. After a sufficient amount of the first reactant and catalyst have been placed in the reaction zone 106, and if desired, a second reactant feed can enter the reaction zone through the feed inlet 104. In some embodiments, the first or second reactant feeds can be used to maintain a pressure in the reaction zone 306. In some embodiments, the reactant feed streams include inert gas (e.g., nitrogen or argon). In some embodiments, the reactant feeds are provided at the same timer or in reverse order. In some embodiments, only one reactant feed is used. In other embodiments, three or more reactant feeds are used. After a sufficient amount of time, the product stream can be removed from the reaction zone 106 via product outlet 108. The product stream can be sent to other processing units, stored, and/or transported.

System 100 can include one or more heating and/or cooling devices (e.g., insulation, electrical heaters, jacketed heat exchangers in the wall) or controllers (e.g., computers, flow valves, automated values, etc.) that are necessary to control the reaction temperature and pressure of the reaction mixture. While only one reactor is shown, it should be understood that multiple reactors can be housed in one unit or a plurality of reactors housed in one heat transfer unit.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Materials: Colloidal silica TM-40 colloidal silica, 40 wt. %, suspended in water (Aldrich), De-ionized water (produced in CENT labs.), ammonium fluoride, aluminum hydroxide PRS (Panreac), ammonium nitrate >=98% (Sigma-Aldrich), and potassium hydroxide 85% pellets (Panreac) were used in the following examples.

Characterization Techniques: The structure analysis was investigated using $^{27}$Al, and $^{29}$Si Nuclear Magnetic Resonance (NMR) spectroscopy and X-ray diffraction (XRD). The XRD patterns were recorded using Rigaku Miniflex diffractometer equipped with Cu Kα radiation (λ=0.15406 nm) at 2θ ranging from 5 to 50° with a scan speed of 3° per min and step size of 0.02.

Ammonia temperature programmed desorption ($NH_3$-TPD) was conducted to investigate the acidity of the zeolites. The $NH_3$-TPD analysis was performed on Chemisorb 2750 Micrometrics chemisorption analyzer over 100 mg of the prepared zeolites. The sample was preheated at 600° C. (heating rate 30° C.min$^1$) under the flow of He (25 ml. min$^{-1}$) for 30 min After allowing the sample to cool to 100° C., $NH_3$ was allowed to flow over the ample with a flow rate of 25 mL. min$^{-1}$ for 30 min. Subsequently, He flow was reconnected for 1 h to remove the weakly adsorb of $NH_3$. Finally, the temperature was ramped to 800 at ramping rate of 10 and the amount desorbed of ammonia was recorded using the TCD detector on a 0.5 s basis.

The elemental compositions of the samples were measured using X-ray fluorescence (XRF), while the morphology of the samples were investigated using the field-emission scanning electron microscope (FE-SEM).

The surface area, pore volume and pore size distribution were analyzed using the physisorption of Nitrogen in ASAP 2020 (Micromeritics). Prior to analysis, the samples were heated up to 350° C. and dwelled for 6 hours. The sample temperature during the analysis was maintained at −196° C. The t-plot was used to measure the volume of micropore, surface area, and the external surface area, while the pore size distribution was estimated using Horvath-Kawazoe model method.

Observations About the Following Examples: A cost-effective Al-rich CHA zeolite was successfully synthesized without using an organic structuring agent. The CHA zeolite was formed under the experimental conditions outlined below. The Si/Al ratios of the gel had a role in the formation of pure CHA, with a slight increase in Si/Al ratio (Si/Al=3.3), impurities of other phase (MER) were formed. High $H_2O/SiO_2$ ratio (from 20 to 35) affected the crystallinity of CHA zeolite, while low $H_2O/SiO_2$ ratio ($H_2O/SiO_2$=10) favored the formation of MER phase. The aging time influenced the rate of crystallization and correspondingly affected the morphologies. At longer aging time, smaller CHA particles were obtained with shorter crystallization time. The synthesized CHA zeolite in H-form (H-CHA) showed higher surface area and larger pore volume than the K-form (K-CHA).

The application of H-CHA in MTO showed that a Al-rich CHA zeolite was very selective to olefins. The deactivation rate and initial selectivity to olefins was attributed to the reaction temperature. The selectivity of the Al-rich CHA zeolite in the MTO reaction was high and comparable to the commercial ZSM-5 and SSZ-13 catalysts.

Example 1

Synthesis of CHA Zeolites 4.21 g of potassium hydroxide was added to 17.23 g of deionized water and placed in an oil-bath at 80° C. To the aqueous solution of potassium hydroxide, 3 g of aluminum hydroxide was added and stirred for 30 min under heating. After cooling to room temperature, 1.07 and 14.44 g of ammonium fluoride and colloidal silica were added, respectively. The final gel (also named as Gel #1) with a molar composition of $1SiO_2$: $0.2Al_2O_3$: $0.39K_2O$: $0.3NH_4F$: $15H_2O$ was aged for x hours at room temperature, x=6, 12, 24, 48. Following this, the final gel was crystallized in a convection oven at 160° C. for y hours, y=48, 60, 72, 96 and 120. Finally, the product was separated and washed with deionized water until neural pH around 7 was obtained. The same procedure was followed in attempting to prepare CHA zeolite from Gel #2, #3, #4 and #5. Table 1 provides the gel molar compositions.

TABLE 1

(Different gel molar compositions used in the synthesis of CHA zeolite)

| Gel # | Molar composition |
| --- | --- |
| 1 | $1SiO_2$:$0.2Al_2O_3$:$0.39K_2O$:$0.3NH_4F$:$xH_2O$ |
| 2 | $1SiO_2$:$0.2Al_2O_3$:$0.39K_2O$:$yNH_4F$:$15H_2O$ |
| 3 | $1SiO_2$:$zAl_2O_3$:$0.39K_2O$:$0.3NH_4F$:$15H_2O$ |
| 4 | $1SiO_2$:$0.2Al_2O_3$:$wK_2O$:$0.3NH_4F$:$15H_2O$ |
| 5 | $1SiO_2$:$0.2Al_2O_3$:$wK_2O$:$0.04Na_2O$:$0.3NH_4F$:$15H_2O$ |

The as synthesized samples, which were in potassium form (K-CHA), were ion-exchanged using ammonium nitrate ($NH_4NO_3$) as a source of proton. For each gram of the sample, 50 mL of 2 M of $NH_4NO_3$ was used and treated under reflux (80° C.) for 3 h. The ion-exchanged was repeated one more time with fresh solution of ammonium nitrate. To have the samples in the protonated form (H-form), the samples were calcined at 500° C. (heating rate 10° C./min.) for 5 h using a muffle furnace.

Example 2

Effect of $H_2O/SiO_2$ Ratio on CHA Formation

Figure 2:
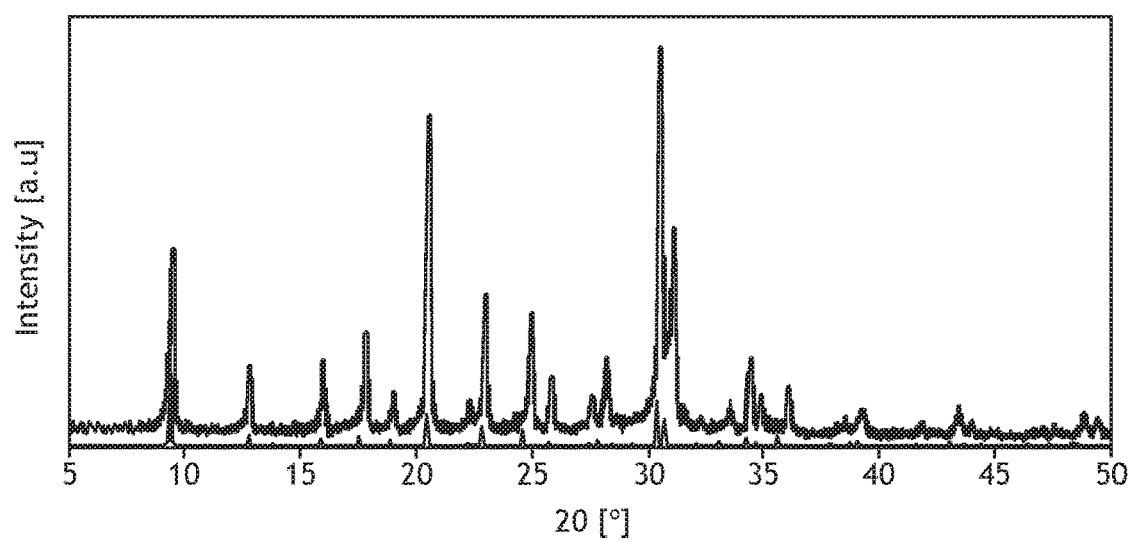
FIG. 2: XRD patterns of the as-synthesized CHA (Run #5) prepared by direct crystallization from amorphous silicoaluminate gel in the absence of SDA as compared to the reference CHA zeolite.
Figure 3:
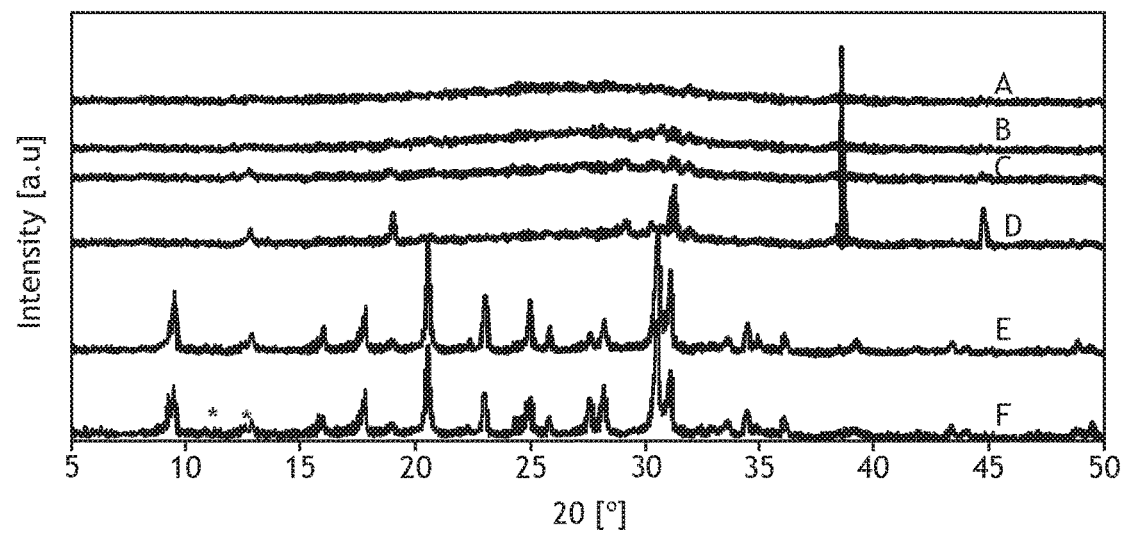
FIG. 3: XRD patterns of samples prepared from Gel #1 at different $H_2O/SiO_2$ ratios; (A) $H_2O/SiO_2$=35, (B) $H_2O/SiO_2$=28, (C)$H_2O/SiO_2$=25, (D) $H_2O/SiO_2$=20, (E) $H_2O/SiO_2$=15, (F) $H_2O/SiO_2$=10. Peaks with * symbol represents the MER phase.

Above Table 1 shows different formula of the silicoaluminate gel used in this study. Firstly, gel #1 was used with x=35 ($H_2O/SiO_2$=35), which had the same gel composition as reported in the literature (B. Liu, Y. Zheng, N. Hu, T. Gui, Y. Li, F. Zhang, R. Zhou, X. Chen, H. Kita, Synthesis of low-silica CHA zeolite chabazite in fluoride media without organic structural directing agents and zeolites, Microporous and Mesoporous Materials, 196 (2014) 270-276.) However, the published procedure was not reproducible, and the inventors were unable to synthesize pure CHA from this batch even at a prolonged crystallization time of up to 5 days. Nevertheless, by altering the water content of the first batch and fixing the crystallization time to 5 days as shown in Table 2 (Run #5) pure CHA zeolite was successfully formed with $H_2O/SiO_2$ molar ratio of 15. FIG. 2 shows the XRD patterns of the CHA zeolite prepared at x=15 and the reference CHA. It is clear that the XRD patterns of the prepared CHA at x=15 are in well agreement with the reference; all characteristic peaks and even small peaks are matching with the reference one. A further decrease in $H_2O/SiO_2$ ratio down to 10 resulted in CHA phase but with Merlinoite (MER) phase as an impurity. The XRD patterns of the CHA zeolite synthesized at different water contents are shown in FIG. 3. From the XRD patterns, the increase in $H_2O/SiO_2$ ratio from 15 up to 35, did not favor the formation of CHA zeolite and amorphous phases were dominating.

TABLE 2

(Water content and crystallization time under which CHA zeolite was formed using Gel # 1; crystallization temperature 160° C., gel Si/Al ratio 2.5, aging time 6 h)

| # | x | Crystallization time(h) | Phase |
|---|------|-----|-----------|
| 1 | 35 | 120 | Am. |
| 2 | 28.5 | 120 | Am. |
| 3 | 25 | 120 | Am. |
| 4 | 20 | 120 | Am. (Oth.) |
| 5 | 15 | 120 | CHA |
| 6 | 10 | 120 | CHA* |
| 7 | 15 | 108 | CHA |
| 8 | 15 | 96 | CHA (am.) |
| 9 | 15 | 72 | Am. (CHA) |
| 10 | 15 | 48 | Am. |

Figure 4:
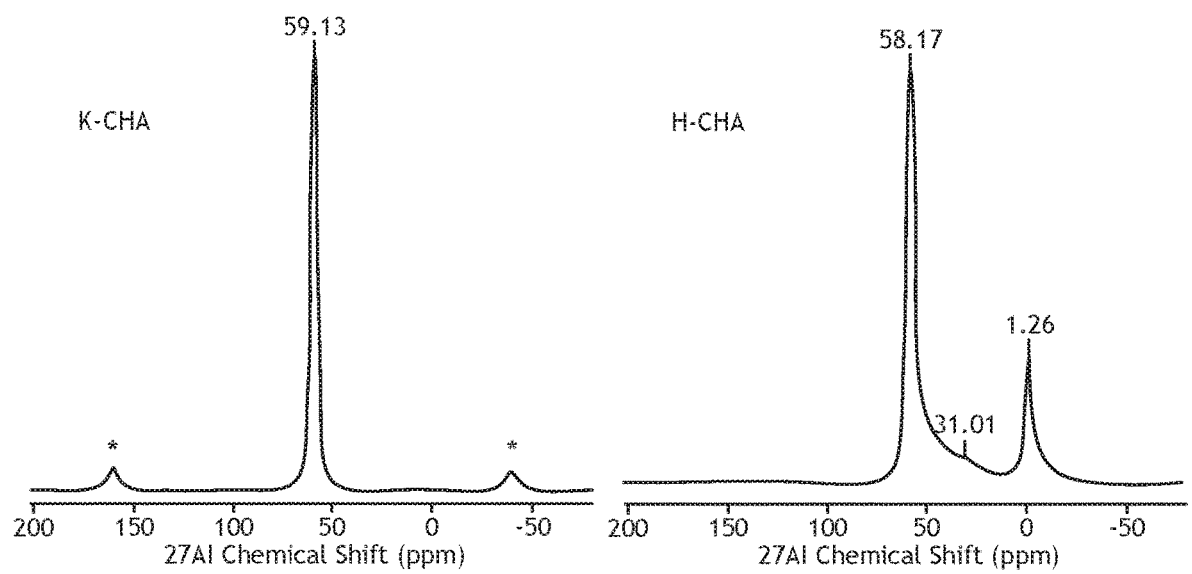
FIG. 4: The $^{27}Al$ MAS NMR spectra of the synthesized CHA before and after ion-exchange and calcination.

FIG. 4 shows the solid-state $^{27}Al$ magic-angle spinning (MAS) NMR spectra of the CHA zeolites before (K-CHA) and after ion-exchanged and calcination (H-CHA). The typical spectrum reveals a peak around 58 ppm attributed to tetrahedral coordination of Al species. A small peak corresponding to the octahedral coordination of Al was observed at around 0 ppm after the ion-exchange and calcination. This additional structure of Al species (the octahedral) might be because of the ion-exchange (H. Imai, N. Hayashida, T. Yokoi, T. Tatsumi, Direct crystallization of CHA-type zeolite from amorphous aluminosilicate gel by seed-assisted method in the absence of organic-structure-directing agents, Microporous and Mesoporous Materials, 196 (2014) 341-348.) or by the calcination as dealumination takes place (B. A. Aufdembrink, D. P. Dee, P. L. McDaniel, T. Mebrahtu, T. L. Slager, Spectroscopic Characterization of Acidity in Chabazite, The Journal of Physical Chemistry B, 107 (2003) 10025-10031).

Example 3

Effect of Aging Time On Crystallization

Figure 5:
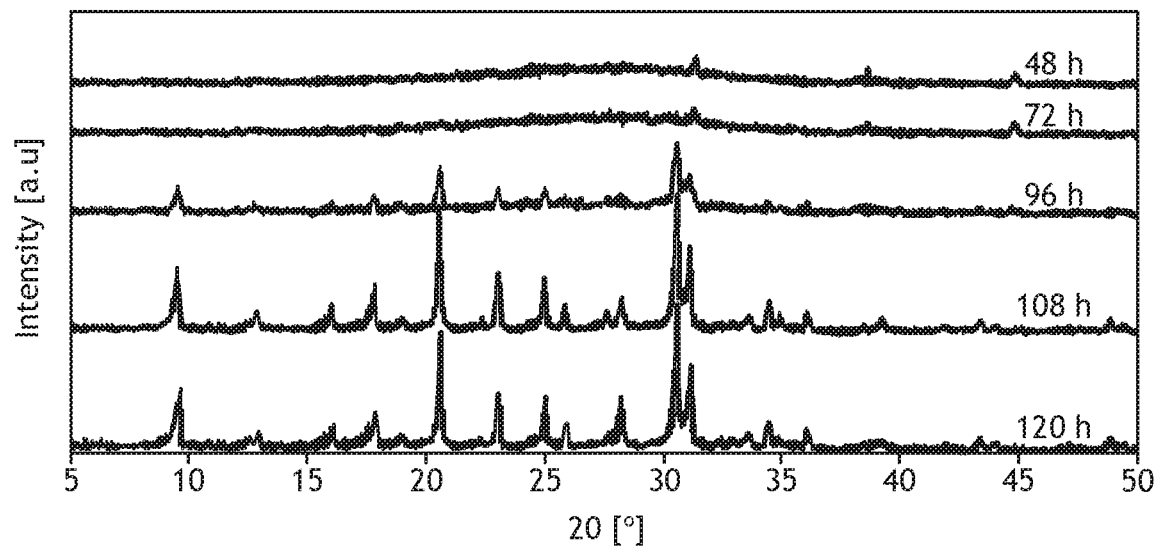
FIG. 5: XRD patterns of samples prepared from Gel #1 with $H_2O/SiO_2$ of 15 at 6 h of aging time for different crystallization times.
Figure 6:
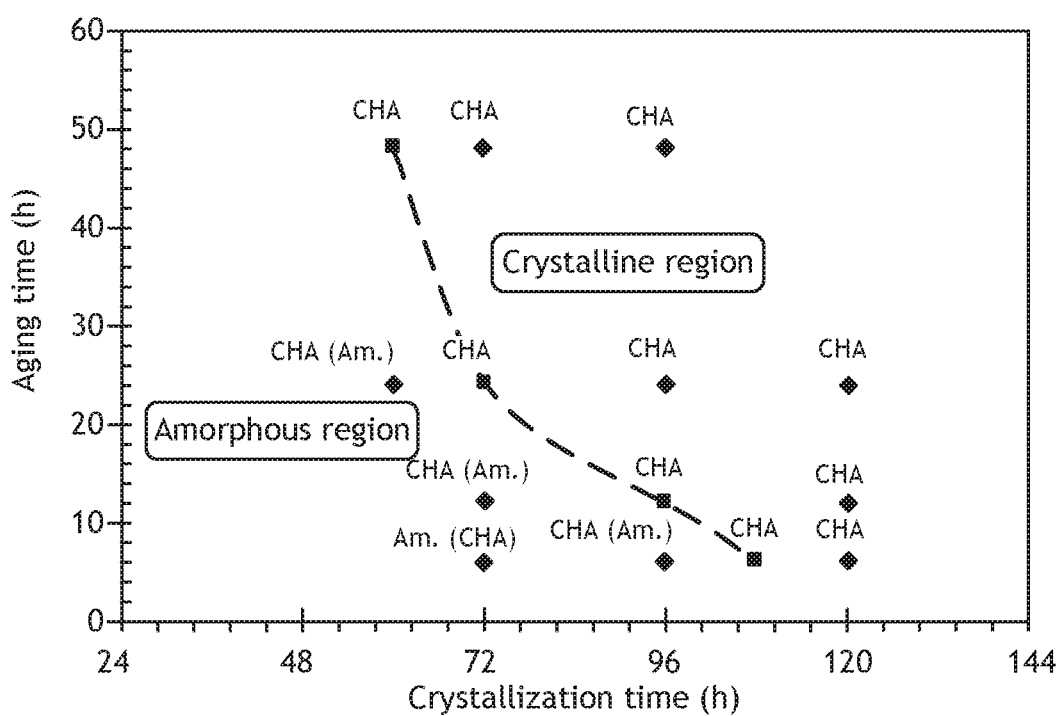
FIG. 6: Formation of CHA zeolite at different aging and crystallization times.

The effect of aging time has been investigated using Gel#1 with x=15. The effect of aging time was studied at 4 different periods as presented in Table 3. The aging time had a significant influence on the crystallization time. Samples aged for longer time, required less crystallization time. For example, the minimum crystallization time for the samples aged for 6 h was between 96 and 108 h, while for those aged for 48 h required only 60 h to get pure and highly crystalline CHA zeolite. The XRD patterns of samples aged for 6 h at different crystallized times are shown in FIG. 5. A picture for understanding the formation of CHA zeolite under different aging and crystallization time is depicted in FIG. 6. The higher the aging time was, the lower the crystallization time required. All points on the dotted line and above it (referred to as the crystalline region) represent conditions where a pure CHA zeolite was formed, while points below the dotted line (referred to as amorphous region) are a combination of CHA and amorphous phase.

TABLE 3

(Effect of aging time on the crystallization of CHA zeolite using Gel # 1 with a $H_2O/SiO_2$ ratio of 15)

| # | T (° C.) | Aging time (h) | Crystallization time(h) | Phase |
|----|-----|----|-----|----------|
| 11 | 160 | 12 | 72 | CHA(Am.) |
| 12 | 160 | 12 | 96 | CHA |
| 13 | 160 | 12 | 120 | CHA |
| 14 | 160 | 24 | 60 | CHA(Am.) |
| 15 | 160 | 24 | 72 | CHA |
| 16 | 160 | 24 | 96 | CHA |
| 17 | 160 | 24 | 120 | CHA |
| 18 | 160 | 48 | 60 | CHA |
| 19 | 160 | 48 | 72 | CHA |
| 20 | 160 | 48 | 96 | CHA |

Example 4

Effect of Aging Time On Morphology

Figure 7:
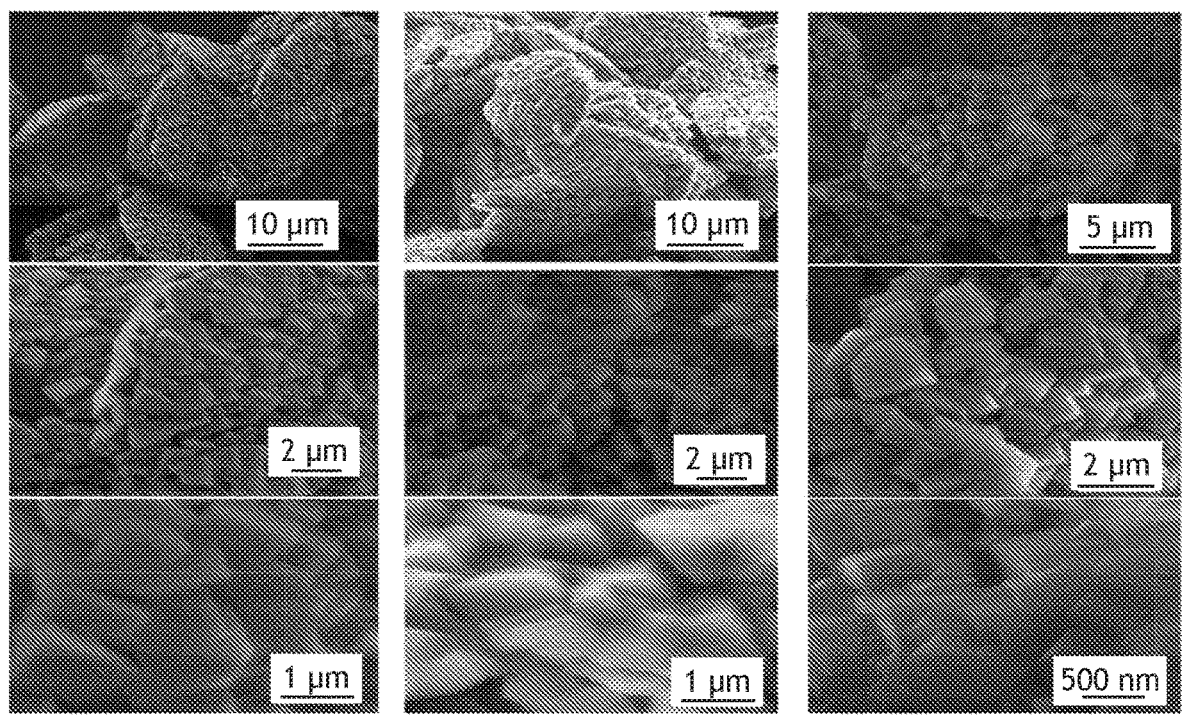
FIG. 7: FE-SEM images at different magnifications of CHA zeolites prepared at different aging times: 6 h (a, b and c), 24 h (d, e and f), and 48 h (g, h and i) at a minimum time of crystallization.

Aging time did not only lower the crystallization time but it also influenced the morphology (particles shape and size) of the prepared CHA zeolite. Samples prepared at lower aging time had different particle shape and size. Generally, the particles are small cuboids, which are agglomerated to form a large particle that is similar to a swollen-disk like shape. FIG. 7 shows FE-SEM images of CHA zeolite which was aged for 6, 24 and 48 h at a corresponding minimum crystallization time. For the aging time of 6 h and crystallization time of 108 h, the large particles seem to be interconnected to form a flower-like shape. The size of these large interconnected particles is ranging between 15 to 20 μm, while the small cuboids which are the components of the larger particles had a size of 1.2-2 μm. The increase in aging time affected both the swollen disk-like shape and the small cuboids. The flower-like shape was not anymore interconnected and appeared to be more dispersed with a size ranging between 10 and 18 μm when the aging time was 24 h. Moreover, the size of the small cuboids decreased to 0.8 μm, still at 24 h aging time. A more increase in aging time up to 48 h caused a desertion to the swollen disk-like shape and become more spread and irregular in shape. Additionally, the small cuboids size decreased up to 400 nm.

Example 5

Effect of Varying $Al_2O$—$NH_4F$—$K_2O/SiO_2$ Ratios

Figure 8:
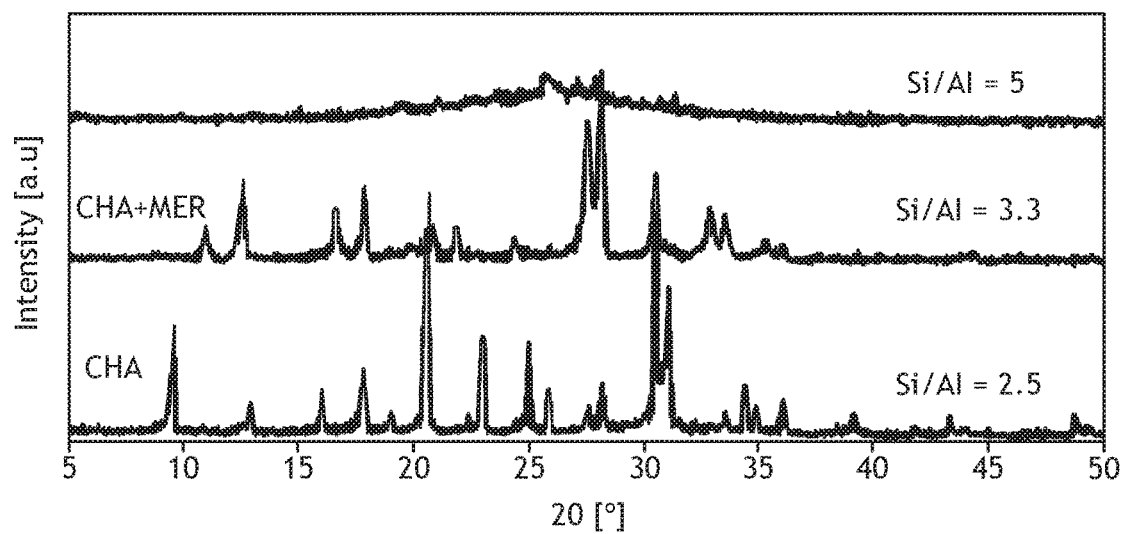
FIG. 8: XRD patterns of samples prepared at different bulk Si/Al ratios.

Table 4 shows different gel compositions (Gel #2, 3 & 4) of the precursor solution. The Si/Al ratio has been varied in in the gel composition in order to have CHA zeolite with different Si/Al ratios and thus different acidity. However, an increase in the Si/Al ratio either by decreasing the source of aluminum or by increasing the source of silica resulted in unwanted phases; either MER as a competitive phase or in amorphous phase as shown in FIG. 8. Similarly, altering concentration of $K_2O$ and $NH_4$ did not favor the formation of CHA zeolite. The introduction of small concentration of $Na_2O$ beside $K_2O$ (Gel #5, Run #25 & 26, Table 4) for the purpose of varying alkaline metals suppressed the formation of CHA zeolite and favor the growth of MER phase.

TABLE 4

(Effect of altering fluoride and aluminum content on the formation of
CHA zeolite synthesized at a crystallization temperature of 160° C.)

| # | Gel # | y | z | w | Si/Al$^a$ | T (° C.) | Aging time (h) | Crystallization time(h) | Phase |
|---|---|---|---|---|---|---|---|---|---|
| 21 | 3 | — | 0.1 | — | 5 | 160 | 6 | 96 | Am. |
| 22 | 3 | — | 0.15 | — | 3.33 | 160 | 24 | 72 | MER |
| 23 | 2 | 0.4 | — | — | 2.5 | 160 | 24 | 72 | Am |
| 24 | 2 | 0.25 | — | — | 2.5 | 160 | 24 | 72 | CHA(Oth.) |
| 25 | 4 | — | — | 0.3 | 2.5 | 160 | 24 | 72 | Am.(CHA) |
| 26 | 5 | — | — | 0.35 | 2.5 | 160 | 24 | 72 | MER(CHA) |

$^a$gel Si/Al ratio

Example 6

Surface Area and Pore Volume Distribution

Figure 9:
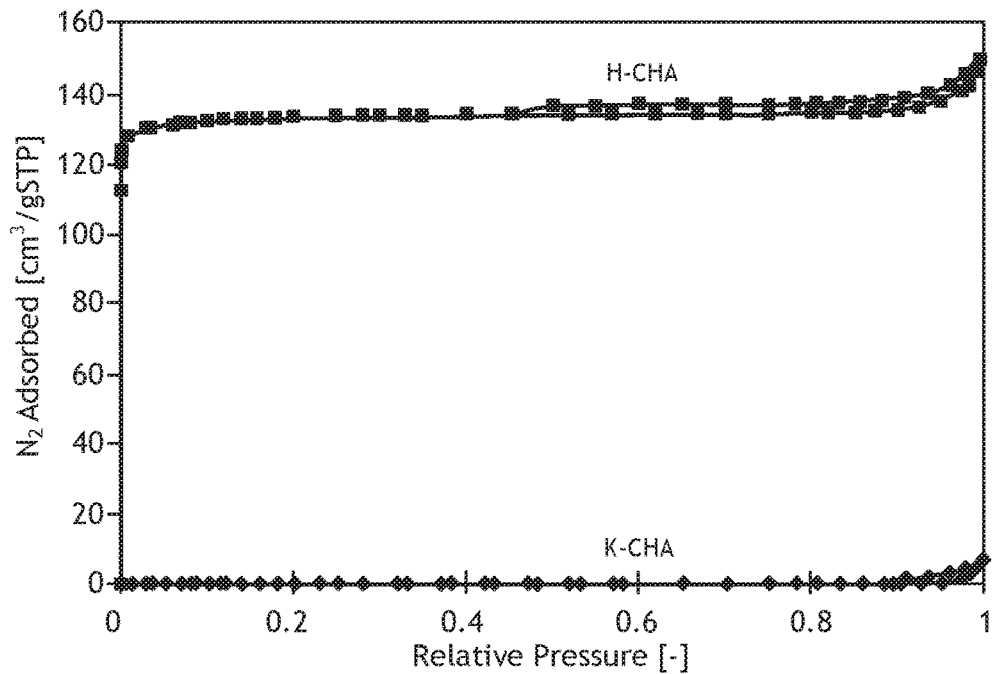
FIG. 9: $N_2$ adsorption/desorption isotherms of the as-synthesized CHA (K-CHA), and after ion-exchanged with ammonium nitrate (H-CHA).
Figure 10:
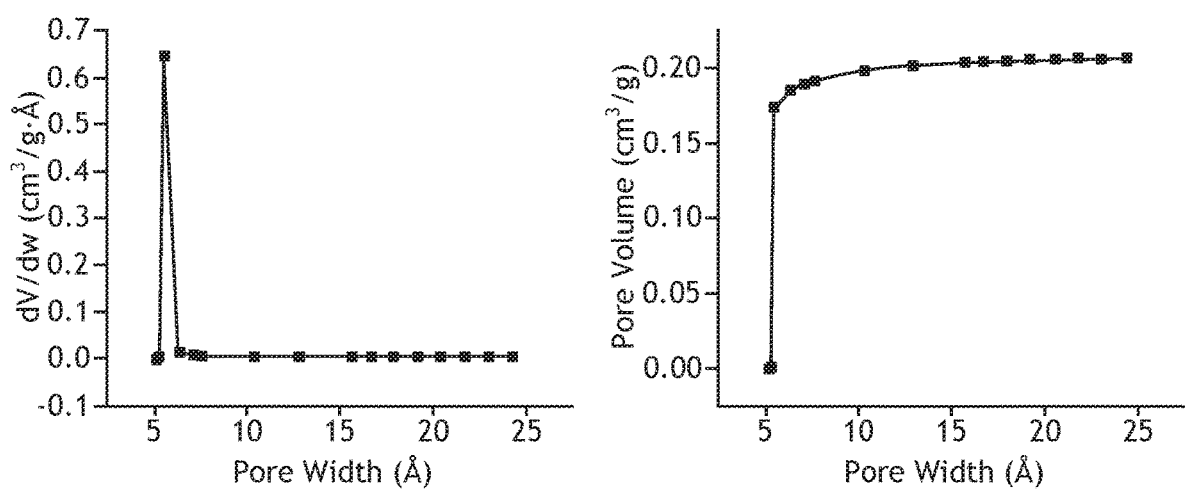
FIG. 10: Micropores of synthesized and modified CHA zeolite samples using Horvath-Kawazoe model.

Table 5 shows the physical properties of the prepared CHA samples before and after ion-exchange. The as-synthesized material in potassium form (K-CHA) had a very poor surface area, while the ion-exchanged sample in H-form (H-CHA) showed an excellent enhancement in the surface area and pore volume. The parent sample (K-CHA), initially, had a BET surface area of ca. 0.96 m$^2$/g and total pore volume of 0.0032 cm$^3$/g. After ion-exchange, the BET surface area and pore volume increased to 485 m$^2$/g and 0.217 cm$^3$/g, respectively. The poor adsorption of sample in K-form is due to the large size of the potassium cation (K+), which might block the small pores of the CHA framework. However, the samples in K-form may still have significant surface area for other smaller adsorbates. FIG. 9 shows the N$_2$ adsorption/desorption isotherm of K-CHA and H-CHA zeolites. The isotherm is classified as Type I isotherm, which is the common isotherm type of CHA zeolite (L. Sommer, D. Mores, S. Svelle, M. Stocker, B. M. Weckhuysen, U. Olsbye, Mesopore formation in zeolite H-SSZ-13 by desilication with NaOH, Microporous and Mesoporous Materials, 132 (2010) 384-394). The pore width of H-CHA zeolite was calculated using the Horvath-Kawazoe model with a main peak at ca. 0.51 nm, as shown in FIG. 10.

Figure 11:
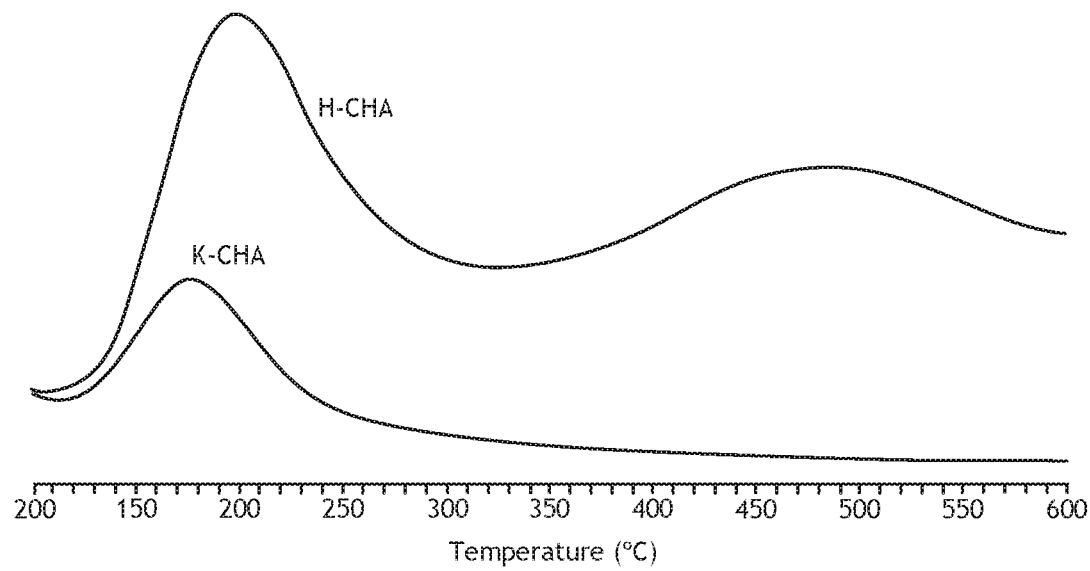
FIG. 11: $NH_3$-TPD profiles of the as-prepared CHA zeolite in K-Form (K-CHA) and after ion-exchanged with 2 M of ammonium nitrate and calcination (H-CHA).

The NH$_3$-TPD profile of the as synthesized CHA zeolite before and after ion-exchange is depicted in FIG. 11. The sample in K-form had only a single small peak at ca.175° C. attributed to weak acid sites present on the surface of the CHA zeolite. However, after ion-exchange (H-CHA), the TPD profile of ammonia showed two peaks at T=195° C. and 475° C. corresponding to weak and strong acid sites, respectively. The increase in the amount of weak acid sites and the appearance of strong acid sites is more probably assigned to the acid sites in the pores of CHA zeolite. A comparison of the selectivity of the Al-rich CHA catalyst to the commercial ZSM-5 and SSZ-13 at the same reaction conditions is shown in FIG. 14. At TOS of 60 min, SSZ-13 showed the highest selectivity while ZSM-5 and Al-rich CHA almost show the same selectivity. However, at higher TOS (120 and 180 min) the Al-rich CHA of the present invention was the more selective catalyst.

Example 7

Methanol-to-Olefin Reaction

The synthesized and modified CHA samples were evaluated in the MTO reaction using a fixed bed reactor. The reaction was conducted at 350, 400 and 450° C. using 50 mg of the prepared catalyst in pellet form (pellets size between 500 and 800 μm). The feed was 5% methanol and the balance was helium as a carrier gas. The flow rate was sat so that the so called Weight Hourly Space Velocity (WHSV) was 0.95 h$^{-1}$. Prior to the reaction analysis, the catalysts were calcined at 500° C. for 1 h under the flow of He. The reaction products were analyzed using an on-line Shimadzu GC-2014 chromatograph equipped with a flame ionization detector and a capillary column HP-PLOT (30 m×0.53 mm, 6 μm film thickness). The conversion of methanol as a

TABLE 5

(Surface Area, Pore Volume and Si/Al Ratio of the CHA Samples)

| Sample | Surface Area (m$^2$/g) | | | | Pore volume (cm$^3$/g) | | | Si/Al$^a$ | Ref. |
| | $S_{ext}$ | $S_{micR}$ | $S_{BET.}$ | $S_L$ | $V_{micro}$ | $V_{meso}$ | $V_{tot}$ | | |
|---|---|---|---|---|---|---|---|---|---|
| K-CHA | 0.089 | 0.87 | 0.96 | 1.3708 | 0.0005 | 0.0027 | 0.0032 | — | Current Example |
| H-CHA | 25 | 461 | 485 | 584 | 0.1952 | 0.0219 | 0.2172 | 2.5 | Current Example |
| K-CHA | — | — | 17.82 | — | 0.002 | 0.050 | 0.052 | 2.2 | [1] |
| Na-CHA | — | — | 257.26 | — | 0.10 | 0.053 | 0.153 | — | [2] |
| K-CHA | 18 | 2 | — | 20 | 0.0008 | — | — | 2.2 | [2] |
| K-CHA | — | — | 7.84 | — | — | — | — | 2.3 | [3] |
| H-CHA | — | — | 396.2 | — | — | — | — | 2.3 | [3] |

Figure 12:
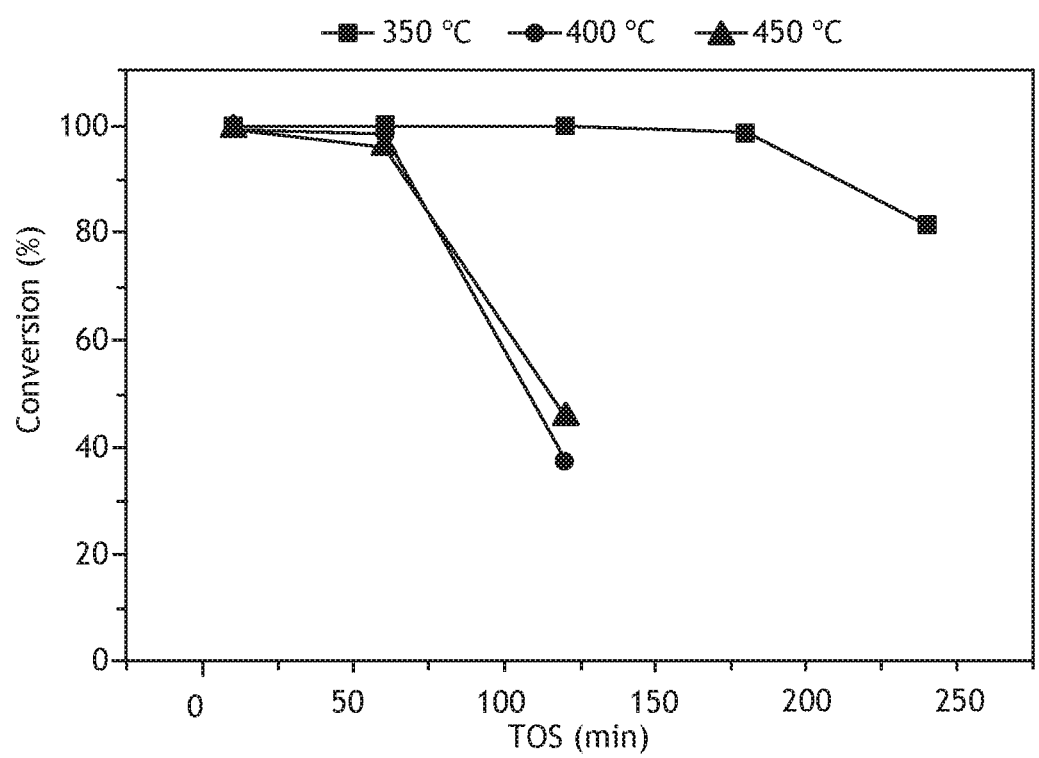
FIG. 12: Conversion of methanol over Al-rich CHA as a function of time on stream (TOS).

$^a$products Si/Al ratio by XRF; $S_L$: Langmuir surface area.
[1] Ridha, F.N., Y. Yang, and P.A. Webley, Adsorption characteristics of a fully exchanged potassium chabazite zeolite prepared from decomposition of zeolite Y. Microporous and Mesoporous Materials, 2009. 117(1-2): p. 497-507.
[2] Shang, J., et al., Potassium Chabazite: A Potential Nanocontainer for Gas Encapsulation. The Journal of Physical Chemistry C, 2010. 114(50): p. 22025-22031.
[3] Nedyalkova, R., et al., Interzeolite Conversion of FAU Type Zeolite into CHA and its Application in NH3-SCR. Topics in Catalysis, 2013. 56(9): p. 550-557.

function of time on stream (TOS) at the three temperatures is shown in FIG. 12. The conversion was related to the increase in temperature. When the temperature was 350° C., the Al-rich CHA catalyst maintained a 100% methanol conversion for more than 180 min, while when the temperature was increase to 400 and 450° C., the catalyst deactivated after 60 min of the initial of the reaction. The prepared CHA zeolite is rich in alumina (Si/Al=2.5), which give rise to higher amount of acid sites. Thus, the deactivation rate was faster at higher temperatures (400 and 450° C.) and decreased when the temperature was 350° C. The selectivity to olefins as a function of temperatures is shown in FIG. 13. At 350° C., the selectivity to light olefins at TOS of 10 min was ca. 62%, then increased with the increase of TOS before the catalyst deactivated. The increase was up to 93.8% at TOS 180 min. Selectivity to olefins, particularly ethylene, was decreased with the increase of TOS. The increase in the selectivity was explained by the pore blockage which hinder the diffusion of propylene. The pore blockage was more obvious at 450° C., as a result of coke formation. Although, the Al-rich CHA zeolites showed better stability when the reaction temperature was 350° C., the 400 and 450 C.° exhibited better selectivity towards light olefins especially at the beginning of the reaction as presented in Table 6. At TOS of 10 min, the olefins selectivity was ca. 87% and ca. 80% when the reaction temperatures were 400 and 450° C., respectively.

TABLE 6

(Products Distribution As a Function of Temperatures Over Al-Rich CHA)

| | 350° C. | | | | 400° C. | | | 450° C. | | |
|---|---|---|---|---|---|---|---|---|---|---|
| TOS | 10 | 60 | 120 | 180 | 10 | 60 | 120 | 10 | 60 | 120 |
| Conv. (%) | 99.9 | 100.0 | 99.9 | 98.7 | 100.0 | 98.3 | 37.4 | 100.0 | 96.6 | 46.0 |
| Propene (%) | 15.87 | 29.3 | 34.7 | 28.6 | 22.2 | 22.6 | 0.0 | 22.53 | 18.1 | 0.0 |
| Ethene (%) | 44.8 | 53.1 | 50.0 | 60.1 | 61.2 | 57.8 | 0.0 | 53.4 | 62.6 | 0.0 |
| Butenes (%) | 1.4 | 4.2 | 8.1 | 5.1 | 3.2 | 4 | 0.0 | 3.6 | 3.4 | 0.0 |
| Total Olefins (%) | 62.1 | 86.6 | 92.8 | 93.8 | 86.6 | 84.3 | 0.0 | 79.5 | 84.1 | 0.0 |
| DME (%) | 0.00 | 0.0 | 0.1 | 2.7 | 0.00 | 1.9 | 97.3 | 0.00 | 2.6 | 99.0 |
| Paraffins (%) | 36.9 | 12.2 | 4.3 | 2.5 | 12.1 | 13.2 | 0.4 | 19.3 | 10.0 | 0.8 |
| C4s (%) | 1.42 | 4.17 | 8.05 | 5.2 | 3.2 | 4.0 | 0.00 | 3.6 | 3.7 | 0.00 |
| over C5s (%) | 1.01 | 1.25 | 2.837 | 1.1 | 1.35 | 0.52 | 2.291 | 1.15 | 3.37 | 0.257 |

The invention claimed is:

1. A method of making a chabazite zeolite, the method comprising:
    (a) obtaining an aqueous gel comprising silicon dioxide ($SiO_2$), aluminum oxide ($Al_2O_3$), potassium oxide ($K_2O$), and a nucleating agent; and
    (b) hydrothermally treating the aqueous gel to obtain the chabazite zeolite;
    wherein the chabazite zeolite is calcined;
    wherein the chabazite zeolite is in the form of cuboid particles;
    and
    wherein the aqueous gel has a molar composition of: $1SiO_2:0.2Al_2O_3:0.39K_2O:0.3NH_4F:xH_2O$, where x is the molar ratio of $H_2O/SiO_2$ and ranges from 10 to 15.

2. The method of claim 1, wherein the aqueous gel in step (a) is maintained at room temperature for 12 to 24 hours prior to the step (b) hydrothermal treatment.

3. The method of claim 2, wherein the cuboid particles have a particle size of 1.2 to 2 μm.

4. The method of claim 1, wherein x is 15.

5. The method of claim 4, wherein the cuboid particles have a particle size of 1.2 to 2 μm.

6. The method of claim 1, wherein x is 10.

7. The method of claim 1, wherein the gel further comprises $Na_2O$.

8. The method of claim 1, wherein hydrothermal treatment is performed at a temperature of 130° C.

9. The method of claim 8, wherein the cuboid particles have a particle size of 1.2 to 2 μm.

10. The method of claim 1, further comprising:
    (c) washing the chabazite zeolite until a pH of about 7 is obtained; and
    (d) performing an ion-exchange to protonate the chabazite zeolite to produce an H-form of the chabazite zeolite.

11. The method of claim 1, wherein the aqueous gel from step (a) is obtained by:
    (i) forming an aqueous solution comprising aluminum hydroxide and potassium hydroxide; and
    (ii) adding ammonium fluoride and colloidal silica to the aqueous solution to form the aqueous gel.

12. The method of claim 1, wherein a templating agent is not used to produce the chabazite zeolite.

13. The method of claim 1, wherein the templating agent is N,N,N-trimethyl-1-adamantammonium iodide.

14. The method of claim 1, wherein the hydrothermal treatment is performed in a PTFE-lined stainless-steel autoclave.

15. The method of claim 1, wherein the cuboid particles have a particle size of 1.2 to 2 μm.

16. The method of claim 15, wherein the cuboid particles are agglomerated to form large interconnected particles ranging in size from 15 to 20 μm.

17. The method of claim 1, wherein the cuboid particles have a particle size of 1.2 μm.

18. A method of making a chabazite zeolite, the method consisting of the steps of:
    (a) obtaining an aqueous gel comprising silicon dioxide ($SiO_2$), aluminum oxide ($Al_2O_3$), potassium oxide ($K_2O$), and a nucleating agent; and
    (b) hydrothermally treating the aqueous gel to obtain the chabazite zeolite;
    wherein the chabazite zeolite is calcined;
    wherein the aqueous gel has a molar composition of: $1SiO_2:0.2Al_2O_3:0.39K_2O:0.3NH_4F:xH_2O$, where x is the molar ratio of $H_2O/SiO_2$ and ranges from 10 to 15;
    wherein the cuboid particles are agglomerated to form large interconnected particles ranging in size from 15 to 20 μm, and
    wherein the cuboid particles have a have a particle size of 1.2 to 2 μm.

19. A method of making a chabazite zeolite, the method consisting of the steps of:

(a) obtaining an aqueous gel comprising silicon dioxide ($SiO_2$), aluminum oxide ($Al_2O_3$), potassium oxide ($K_2O$), and a nucleating agent; and
(b) hydrothermally treating the aqueous gel to obtain the chabazite zeolite;

wherein the chabazite zeolite is calcined;

wherein the aqueous gel has a molar composition of: $1SiO_2:0.2Al_2O_3:0.39K_2O:0.3NH_4F:xH_2O$, where x is the molar ratio of $H_2O/SiO_2$ and ranges from 10 to 15;

wherein the cuboid particles are agglomerated to form large interconnected particles ranging in size from 15 to 20 μm, wherein the cuboid particles have a have a particle size of 1.2 to 2 μm; and wherein the chabazite zeolite further comprises sodium oxide.

* * * * *